United States Patent
Wingkono et al.

(10) Patent No.: US 9,475,329 B2
(45) Date of Patent: Oct. 25, 2016

(54) PRINT MEDIUM SURFACE TREATMENT

(75) Inventors: Gracy Apprisiani Wingkono, San Diego, CA (US); Xiaoqi Zhou, San Diego, CA (US); Christopher Cobbs, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 95 days.

(21) Appl. No.: 14/235,074

(22) PCT Filed: Jul. 29, 2011

(86) PCT No.: PCT/US2011/046007
§ 371 (c)(1),
(2), (4) Date: Jan. 26, 2014

(87) PCT Pub. No.: WO2013/019195
PCT Pub. Date: Feb. 7, 2013

(65) Prior Publication Data
US 2014/0168337 A1    Jun. 19, 2014

(51) Int. Cl.
*G01D 11/00*    (2006.01)
*B41M 5/52*    (2006.01)
*B41J 3/407*    (2006.01)
*B41M 7/00*    (2006.01)
*C09D 11/00*    (2014.01)

(52) U.S. Cl.
CPC ........... *B41M 5/52* (2013.01); *B41J 3/407* (2013.01); *B41M 5/5245* (2013.01); *B41M 7/009* (2013.01); *B41M 7/0072* (2013.01); *B41M 7/0081* (2013.01); *C09D 11/00* (2013.01)

(58) Field of Classification Search
None
See application file for complete search history.

(56) References Cited

U.S. PATENT DOCUMENTS

| | | | |
|---|---|---|---|
| 6,670,000 B1* | 12/2003 | Misuda | B41M 5/52 347/105 |
| 6,699,536 B2* | 3/2004 | Katoh et al. | 428/32.28 |
| 6,908,185 B2 | 6/2005 | Chen et al. | |
| 2006/0014640 A1 | 1/2006 | Tani et al. | |
| 2006/0078695 A1 | 4/2006 | Sen et al. | |
| 2006/0083871 A1 | 4/2006 | Chen | |
| 2006/0203056 A1* | 9/2006 | Furukawa et al. | 347/96 |
| 2006/0204759 A1* | 9/2006 | Muthiah | 428/413 |
| 2007/0014940 A1 | 1/2007 | Linhart et al. | |
| 2008/0124499 A1* | 5/2008 | Sundvall et al. | 428/32.2 |
| 2009/0035478 A1 | 2/2009 | Zhou et al. | |
| 2010/0143589 A1* | 6/2010 | Spinelli et al. | 427/256 |
| 2010/0206503 A1* | 8/2010 | Yabe et al. | 162/158 |
| 2010/0222492 A1 | 9/2010 | Sarkisian et al. | |
| 2010/0233391 A1 | 9/2010 | Kumada et al. | |
| 2010/0273016 A1* | 10/2010 | Meiwa | C08F 220/56 428/479.6 |

FOREIGN PATENT DOCUMENTS

| | | |
|---|---|---|
| JP | 2007253359 | 10/2007 |
| JP | 2008093859 | 4/2008 |
| WO | 2009095697 A1 | 8/2009 |
| WO | 2010114560 A1 | 10/2010 |
| WO | 2011014199 A1 | 2/2011 |

OTHER PUBLICATIONS

International Search Report and Written Opinion (ISR/WO) dated Apr. 6, 2012 (8 pages) from ISA/KR for counterpart PCT Patent Application No. PCT/US2011/046007.

* cited by examiner

*Primary Examiner* — Erica Lin
(74) *Attorney, Agent, or Firm* — Dierker & Kavanaugh, P.C.

(57) ABSTRACT

A print medium surface treatment includes a first composition that includes a filler, and a polymer that is non-film forming until it is subjected to film forming conditions. The first composition has a charge density that is large enough to promote crashing of particulate colorants of an ink and low enough to avoid crashing of the filler.

19 Claims, No Drawings

PRINT MEDIUM SURFACE TREATMENT

CROSS-REFERENCE TO RELATED APPLICATIONS

N/A

STATEMENT REGARDING FEDERALLY SPONSORED RESEARCH OR DEVELOPMENT

N/A

BACKGROUND

Printing techniques can be broadly categorized into two groups: analog and digital. Common analog techniques are offset lithography, flexographic, gravure and screen printing. Inkjet and electrophotographic printing are the most prevalent digital technologies. Digital printing has an advantage over its analog counterpart in that printed output can be digitally altered, meaning that every printed page can be different. To change the printed output of an analog printer, a new set of imaging plates or stencils must be produced. Print quality is another vector of comparison between printing methods. Analog prints often have had excellent image quality, but digital printing is approaching the quality of analog printing with the advancement of printer hardware, printing inks and print media.

Inkjet printers are now common and affordable and allow one to obtain photographic quality. They are used in home printing, office printing and more recently, in commercial printing. The growth of inkjet printing is a result of a number of factors including reductions in cost of inkjet printers and improvements in print resolution and overall print quality. A continued demand in inkjet printing has resulted in a need to produce images of high quality, high permanence and high durability while maintaining a reasonable cost. Key advantages for inkjet technology in the commercial printing market are that printing width can be easily scaled and high speed printing has been achieved. For example, high speed inkjet web press printing is a printing technology typically used in industrial or commercial applications, e.g., to print books, magazines and brochures.

Print media used in printing have various affects on printed image attributes such as print quality, print durability and reliability, and print finish that are important attributes to end users regardless of printing technology used. The challenge is to produce print media that can maintain the printed image attributes in an optimum status.

DETAILED DESCRIPTION

For most print media, there can be trade-offs between print quality, print durability, print speed and cost of printing. For example, glossy media used in inkjet web press printing may have a trade-off between gloss and absorptivity of the media. Another trade-off may be encountered between print durability and print quality (especially optical density and color gamut volume). Such trade-offs may be avoided using the principles described herein to provide print media with one or more of good to excellent absorptivity, high gloss, good to excellent print durability and good to excellent print quality for any printing technology.

Examples in accordance with the principles described herein are directed to a surface treatment to treat print media. In some examples, the surface treatment comprises a first composition. The first composition comprises a filler and a polymer that is non-film forming until subjected to film forming conditions. The first composition has a charge density that is large enough to promote crashing of particulate colorants of an ink and low enough to avoid crashing of the filler.

The polymer comprises one or both of an ionically charged polymer and a neutral-charged amphoteric polymer. The charge or lack thereof on the polymer is with respect to an overall charge nature on the polymer particles surface. The ionically charged polymer may be a cationic polymer or an anionic polymer. When the polymer in the first composition is a cationic polymer then the first composition has the aforementioned charge density. When the first composition comprises one or both of the anionic polymer and a neutral-charged amphoteric polymer (i.e., 'neutral amphoteric' or 'amphoteric' herein has the same meaning as 'neutral-charged amphoteric'), the first composition further comprises a multivalent metal ion to provide the aforementioned charge density to the first composition. In some examples, the surface treatment further comprises a second composition that comprises the multivalent metal ion. In some examples, the surface treatment comprises the second composition even when the first composition comprises a cationic polymer. In some examples, the first composition and the second composition may be either separate from one another or in intimate combination. The phrase 'intimate combination' means that the first and second compositions are dispersed with one another in a single container or may mean that the first composition comprises the second composition.

In some examples of the surface treatment, the first composition comprises the second composition, in intimate combination, if the non-film forming polymer in the first composition comprises one or both of an anionic polymer and an amphoteric polymer. In other examples of the surface treatment, the first composition may comprise the second composition, in intimate combination, even if the non-film forming polymer comprises a cationic polymer. In other examples of the surface treatment, the surface treatment separately comprises the first composition and the second composition (i.e., not in intimate combination) if the non-film forming polymer in the first composition is an anionic polymer or an amphoteric polymer. However, the surface treatment may separately comprise the first composition and the second composition even if the non-film forming polymer in the first composition is a cationic polymer.

By definition herein, a 'non-film forming polymer' does not form a continuous film until the polymer is subjected to film forming conditions. In particular, a 'non-film forming polymer' is defined herein as polymer particles that substantially keep their original morphology as it existed in a raw material state and the polymer particles do not substantially change their shape during any of such processing including media coating and printing, in which the polymer particles are included, until subjected to conditions for forming a continuous film. For example, spherical polymer particles will form a particle matrix during media coating processing, but the individual polymer particles will not deform or collapse to form a continuous polymeric film in accordance with the examples herein. The non-film forming polymer may be an aqueous or solvent dispersion of polymer particles, solid polymer particles, solid polymer particles in solution or a slurry thereof.

In accordance with some examples of the principles herein, the cationic polymer has a charge density that is large enough to promote crashing of particulate colorants of an ink (e.g., during printing) and low enough to avoid crashing of the filler in the first composition (e.g., during media manufacture or coating). In particular, the cationic polymer in the first composition promotes crashing without a multivalent metal ion or the second composition that comprises the multivalent metal ion. However, in some examples, inclusion of the second composition with the cationic polymer of the first composition may facilitate and accelerate the crashing. In contrast, each of the anionic polymer and the amphoteric polymer does not promote crashing of the particulate colorants of an ink without the presence of the multivalent metal ion or the second composition that comprises the multivalent metal ion. In some examples, the first composition and the second composition are substantially free from a colorant. The phrase 'substantially free' means that the composition does not comprise detectable levels of a colorant.

As mentioned above, the surface treatment is used to treat (or i.e., pretreat) print media. A treated print medium may be used to prepare printed images by dispensing ink to the treated print medium in an image pattern. The polymer of the first composition in a non-film form state forms a porous structure and is absorptive to the ink. In the example of the cationic polymer, the porous, absorptive structure in the non-film form state facilitates crashing of colorants in the ink. In the examples of the anionic polymer and the amphoteric polymer, the multivalent metal ion, for example of the second composition, facilitates crashing and binding of ink colorants that are not crashed or bound by either the amphoteric polymer or the anionic polymer.

After images have been printed on the treated print medium, the printed medium is subjected to physical or chemical conditions for example, one or more of heat, pressure, UV exposure, microwave exposure, and plasma treatment, for the polymer to form a continuous film, e.g., at an outermost surface. The polymer film encapsulates the colorants and other underlying materials, for example, to protect the printed image and provide gloss. In some examples, the resulting printed images have a high degree of gloss and excellent durability, including, e.g., highlighter durability, wet-rub (smear) durability, and dry-rub durability. Moreover in some examples, high print density and color gamut volume are maintained with substantially no visual color-to-color ink bleed. In some examples, the treated print medium may further exhibit one or more of an increase in fade resistance, curl resistance, moisture resistance, smoothness, paper thickness, gloss and one or both of wet durability and dry durability, for example. In addition, the print medium surface treatment and treated print medium do not require any high cost raw material such as photo-based print media stock.

As used herein, the article 'a' is intended to have its ordinary meaning in the patent arts, namely 'one or more'. For example, 'a filler' generally means one or more fillers and as such, 'the filler' means 'the filler(s)' herein. The phrase 'at least' as used herein means that the number may be equal to or greater than the number recited. Any ranges of values provided herein include values and ranges within or between the provided ranges. Also, any reference herein to 'top', 'bottom', 'upper', 'lower', 'up', 'down', 'back', 'front', 'left' or 'right' is not intended to be a limitation herein. The designations 'first' and 'second' are used herein for the purpose of distinguishing between items, such as 'first composition' and 'second composition', and are not intended to imply any sequence, order or importance to one item over another item or any order of operation, unless otherwise indicated. Moreover, examples herein are intended to be illustrative only and are presented for discussion purposes and not by way of limitation.

The term 'about' as used herein means a value within normal tolerance of the equipment or technique used to measure the value. In some examples, 'about' means the number recited may differ by plus or minus 20%, or plus or minus 15%, or plus or minus 10%, or plus or minus 5%. In some examples, the term 'between' when used in conjunction with two numbers such as, for example, 'between about 2 and about 50', includes both of the numbers recited.

The term 'crashing' as used herein refers to a reaction of charged colorants of an ink with ionic charges of one or both of the non-film forming polymer and the metal ions (when present), such that the charged colorants become neutralized and then accumulated, they separate out of an ink solution and become embedded in the surface treatment on the treated print medium.

As mentioned above, the first composition of the surface treatment comprises a filler. The filler is an inorganic material that is employed to improve various properties of treated print media such as, for example, smoothness, density, opacity and brightness. The filler may be referred to as a pigment or inorganic pigment herein. In some examples, the filler has a micro-porous structure. Examples of filler include, but are not limited to, calcium carbonate (ground (GCC) or precipitated (PCC)), aluminum silicate, mica, magnesium carbonate, silica, alumina, boehmite, talc, kaolin clay, or calcined clay, or combinations of two or more of any of the above. Other examples include, but are not limited to, either porous clays or calcium carbonates that are reaction products of a respective clay or calcium carbonate with colloidal silica; or particles of any of titanium dioxide, silicon dioxide, aluminum trihydroxide, or zirconium oxide, for example, inter-calcined into structured clay or calcium carbonates, for example, and combinations of two or more of any of the above.

An amount by percent (%) weight of filler in examples of the first composition of the print medium surface treatment in accordance with the principles described herein is within a range of about 5% to about 90%. In some examples, the amount of filler in the first composition is with the range of about 5% to about 85%, or about 5% to about 75%, or about 5% to about 60%, or about 10% to about 90%, or about 20% to about 90%, or about 30% to about 90%, or about 40% to about 90%, or about 60% to about 80% by weight. In some examples, the amount of filler in the first composition is within the range of about 65% to about 75% by weight. In some examples, an amount by % weight of filler or pigments in the first composition may be up to 90% (for example, clay or calcium carbonate or a mixture of both).

Also as mentioned above, the polymer is non-film forming until it is subjected to film forming conditions. The film forming conditions are those conditions under which the polymer forms a continuous film. Such conditions include, but are not limited to, a controlled elevated temperature environment or a controlled elevated pressure environment, or combination of elevated temperature and pressure, that is at or above a glass transition temperature (Tg) of the polymer, for example. Specific approaches include, but are not limited to, using a temperature controlled drying chamber or a calendering press to form a polymer film from the polymer in the first composition.

In some examples, the polymer may be in the form of fine particles (solid state) or a dispersion (liquid state). In some examples, a particle size of the polymer may be in a range of about 0.2 microns to about 30 microns, or in the range of about 0.5 microns to about 25 microns, or about 0.5 microns to about 20 microns, or about 0.5 microns to about 15 microns, or about 0.5 microns to about 10 microns. Moreover, in some examples, the polymer may have a molecular weight in a range of about 300 to about 800,000 or more. In some examples, the chemistry of the polymer particles may be based on polyolefins including, but not limited to, polyethylene, polypropylene wax and emulsion, and polyacrylate emulsion. With respect to the amphoteric polymer, in some examples, no specific limitations apply as long as the amphoteric polymer meets the non-film forming condition, as described herein.

In some examples, the polymer has a glass transition temperature ($T_g$) that is above ambient room temperature (i.e., above about 25° C.), for example more than about 30 degrees above room temperature. For example, the $T_g$ of the polymer is within a range of about 45° C. to about 170° C. In some examples, the $T_g$ of the polymer is within the range of about 50° C. to about 165° C., or about 60° C. to about 150° C., or about 75° C. to about 145° C., or about 95° C. to about 130° C.

Also as mentioned above, the cationic polymer has a charge density that is large enough to promote crashing of particulate colorants of an ink and low enough to avoid crashing of the filler. The 'charge density' is defined herein as a number of ionic monomer units over (or divided by) a total number of monomer units in a molecular chain of the polymer. In some examples, the charge density of the cationic polymer is within a range of about 0.0008 to about 0.006, or about 0.001 to about 0.005, or about 0.001 to about 0.004, for example.

In some examples, the polymer is generally about 10 to about 100,000 monomer units or more in length, for example. The number of monomer units depends on the number of atoms in the monomer unit chain, the composition of the monomer unit, and so forth. In some examples, the polymer is or about 100 to about 100,000 monomer units in length, or about 300 to about 100,000 monomer units in length, or about 500 to about 100,000 monomer units in length, or about 700 to about 100,000 monomer units in length, or about 1,000 to about 100,000 monomer units in length, or about 2,000 to about 100,000 monomer units in length, or about 3,000 to about 100,000 monomer units in length, or about 5,000 to about 100,000 monomer units in length. In some examples, the polymer is about 1,000 to about 80,000 monomer units in length, or about 1,000 to about 40,000 monomer units in length, or about 1,000 to about 20,000 monomer units in length, or about 1,000 to about 10,000 monomer units in length. In some examples, the monomer units of the polymer comprise carbon atoms and may additionally comprise one or more heteroatoms such as, for example, oxygen, sulfur, nitrogen, phosphorus, and silicon.

In some examples, the molecular weight of the polymer is generally within a range of about 90 to about 9,000,000 or more, for example. In some examples, the molecular weight of the polymer is within the range of about 180 to about 9,000,000, or about 500 to about 9,000,000, or about 1,000 to about 9,000,000, or about 10,000 to about 9,000,000, or about 100,000 to about 9,000,000. In some examples, the molecular weight of the polymer is within the range of about 100 to about 900,000, or about 500 to about 900,000, or about 1,000 to about 900,000, or about 10,000 to about 900,000, or about 100,000 to about 900,000, or about 100 to about 100,000, or about 200 to about 100,000, or about 1,000 to about 100,000, or in some examples, about 10,000 to about 100,000.

The polymer may be linear or branched or a combination thereof. A linear polymer comprises a linear chain of atoms and a branched polymer comprises a branched chain of atoms. Each atom of the linear chain may have one or more substituents in place of hydrogen. In some examples, the polymer may be a copolymer comprising more than one type of monomer unit. The relationship of the different monomer units in the polymer may be alternating, random, periodic, or a combination thereof, for example, and may also be in a block copolymer arrangement where blocks of repeating monomer units form the polymer chain.

In some examples, cationic polymers have positive charges on one or more atoms of the chain of the cationic polymer, or on one or more substituents or pendant groups of the atoms of the cationic polymer, or a combination of both. For example, the number of positive charges on the cationic polymer is within a range of about 1 to about 100,000 per polymer chain. In some examples, the number of positive charges on the cationic polymer is within the range of about 2 to about 100,000, or about 5 to about 100,000, or about 10 to about 100,000, or about 50 to about 100,000, or about 100 to about 100,000, or about 10 to about 90,000, or about 50 to about 90,000, or about 100 to about 90,000, or about 10 to about 80,000, or about 50 to about 80,000, or about 100 to about 80,000, or about 10 to about 70,000, or about 50 to about 70,000, or about 100 to about 70,000, or about 10 to about 60,000, or about 50 to about 60,000, or about 100 to about 60,000, or about 100 to about 50,000, or about 200 to about 50,000, or about 500 to about 50,000. In some examples, the number of positive charges on the cationic polymer is within the range of about 100 to about 10,000.

In some examples, the positive charges on the cationic polymer arise from the presence in the cationic polymer of one or more of a quaternary or protonated amine, quaternary pyridinium, quaternary imidazolium, quaternary phosphonium, and sulfonium. The amine may be, for example, a primary amine, a secondary amine or a tertiary amine, any of which may be, e.g., a monoamine, a diamine, a triamine, a polyamine, or mixtures thereof. Examples of suitable monoamines, diamines, triamines or polyamines that may be present in the polymer chain or present as a substituent on the polymer chain include, but are not limited to, one or more of ammonia, methyl amine, dimethylamine, ethylene diamine, dimethylaminopropylamine, bis-dimethylaminopropylamine (bis-DMAPA), hexamethylene diamine, benzylamine, isoquinoline, ethylamine, diethylamine, dodecylamine, tallow triethylenediamine, mono substituted monoamine, monosubstituted diamine, monosubstituted polyamine, disubstituted monoamine, disubstituted diamine, disubstituted polyamine, trisubstituted triamine, trisubstituted polyamine, multisubstituted polyamine comprising more than three substitutions provided at least one nitrogen contains a hydrogen, and mixtures thereof.

Examples of cationic polymers include, but are not limited to, polymers containing cationic monomer units derived from cationic, ethylenically unsaturated monomers of the type of one or more of dialkylaminoalkyl(meth)acrylamides, N-alkyl(meth)acrylamides and N,N-dialkyl(meth)acrylamides. Examples of such monomers are dialkylaminoalkyl (meth)acrylamides with 1 to 6 carbon atoms, or with 1 to 3 carbon atoms, in the alkyl or alkylene groups including, but not limited to, dimethylaminoethyl(meth)acrylamide, diethylaminoethyl(meth)acrylamide, diethylaminopropyl(meth) acrylamide, dimethylaminopropyl(meth)acrylamide, dimethylaminobutyl(meth)acrylamide, diethylaminobutyl (meth)acrylamide; and cationized N-alkyl meth)acrylamides or N,N-dialkyl(meth)acrylamides with alkyl residues of 1 to 6 carbons atoms including, but not limited to, N-methyl (meth)acrylamide, N,N-dimethylacrylamide, N-ethyl(meth) acrylamide, N-propyl(meth)acrylamide, and tert-butyl (meth)acrylamide.

The cationic polymer generally includes a counter ion, the nature of which depends on one or more of the nature of the cation of the cationic polymer, the molecular weight of the polymer, and the types of cations, for example. Specific examples of counter ions for cationic polymers include, but are not limited to, one or more of halogen anion such as chloride, bromide, or iodide; carboxylic acid anion, phosphoric acid anion, sulfuric acid anion, hexafluorophosphorus anion, tetraphenyl boronic anion, chlorate, perchlorate, nitrate, and phenolate. Cationic polymers that may be employed in the polymer of the first composition are commercially available or may be synthesized using standard polymerization techniques.

In some examples, the polymer may be an anionic polymer, which has negative charges on one or more atoms of the chain of the anionic polymer or on one or more substituents or pendant groups of the atoms of the anionic polymer or a combination of both. The number of negative charges on the anionic polymer is in a low range to a moderate range such that the anionic polymer does not adversely react with the multivalent metallic salt, for example in the second composition. In some examples, the anionic charge of the anionic polymer is characterized in terms of its Zeta potential and viscosity. The Zeta potential is the potential across the interface of solids and liquids, specifically, the potential across a diffuse layer of ions surrounding a charged colloidal particle which is largely responsible for colloidal stability. Zeta potentials can be calculated from electrophoretic mobilities, namely, the rates at which colloidal particles travel between charged electrodes placed in the dispersion, emulsion or suspension containing the colloidal particles, and can be also measured under fixed pH value using a Zeta Sizer. In some examples, the anionic polymer has a low Zeta potential value, which ranges from about −20 millivolts to about −100 millivolts, for example. In some examples, the Zeta potential value of the anionic polymer ranges from about −20 millivolts to about −80 millivolts, or about −20 millivolts to about −60 millivolts, or about −20 millivolts to about −40 millivolts, or about −30 millivolts to about −100 millivolts, or about −50 millivolts to about −100 millivolts, or about −70 millivolts to about −100 millivolts.

In some examples of anionic polymers, the negative charges arise from the presence in the anionic polymer of carboxylate, phosphorate, sulfonate, sulfinate, phosphate, phosphinate, sulfate, or combination of two or more thereof, for example. Specific examples, of anionic polymers include, but are not limited to, one or more of polyacrylic acid, polymethacrylic acid, polystyrene sulfonic acid, poly (vinylphosphate), poly(methacryloyloxyethylsuccinate), poly(methacryloxyethylphosphate), poly(2-acrylamido-2-methyl-1-propanesulfonic acid), and poly(2-acrylamidoglycolic acid), as well as copolymers containing two or more thereof.

An amount of polymer in examples of the first composition of the print medium surface treatment is dependent on a variety of factors including, but not limited to, the nature of the polymer in the composition, the form of the polymer in the composition, and the film forming behavior of the polymer. For example, the polymer may be in the form of beads, cylinders, or other particle shapes, for example, and may be provided as a mixture of two or more of such forms or shapes. Moreover, the polymer particles may be hollow, solid, partially hollow, or partially solid, or be provided in mixtures of two or more thereof. The amount by % weight of the polymer in the first composition of the print medium surface treatment is within a range of about 0.5% to about 5%, for example. In some examples, the amount of the polymer in the first composition is within the range of about 0.5% to about 4% by weight, or about 0.5% to about 3% by weight, or about 1% to about 3% by weight, or about 0.8% to about 5% by weight, or about 1% to about 5% by weight, or about 1.5% to about 5% by weight, or about 2% to about 5% by weight.

In some examples, the first composition of the print medium surface treatment further comprises a binding agent or 'binder'. The binder may include one or both of water-based binder and a water dispersible binder including, but not limited to, latex, polyvinyl alcohol (PVA), starch, styrene-butadiene, acrylates, or combinations or mixtures of two or more thereof. Examples of commercial binder useful in the first composition include, but are not limited to, MOWIOL® 1599 polyvinyl alcohol, MOWIOL® 488 polyvinyl alcohol, and PVA 105 polyvinyl alcohol (Kuraray America, Inc., Houston Tex.), for example. An amount by % weight of binder in the first composition of the print medium surface treatment is within a range of about 5% to about 40%, for example. In some examples, the amount of the binder is within the range of about 5% to about 30%, or about 5% to about 20%, or about 10% to about 40%, or about 10% to about 30%, or about 10% to about 25%, or about 25% to about 40% by weight. In some examples, the amount of the binder in the first composition of the print medium surface treatment is within the range of about 27% to about 35% by weight.

In some examples, the first composition of the print medium surface treatment further comprises a defoaming agent or 'defoamer'. Examples of defoamers useful in the first composition include, but are not limited to, AC22® (Dow Chemicals), FLOFOAM (SNF Floerger), or Surfynol (AirProducts). An amount by % weight of the defoamer in the first composition is within a range of about 0.001% to about 2%, for example. In some examples, the amount of defoamer is within the range of about 0.001% to about 1.5%, or about 0.001% to about 1%, or about 0.001% to about 0.5%, or about 0.005% to about 2%, or about 0.005% to about 1%, or about 0.005% to about 0.5%, or about 0.008% to about 1.5%, or about 0.008% to about 1%, or about 0.008% to about 0.5%, or about 0.008% to about 0.1% by weight.

As mentioned above, the print medium surface treatment comprises a second composition, in some examples. The second composition includes the multivalent metal ion. For example, the print medium surface treatment comprises the second composition if the first composition comprises one or both of an anionic polymer and an amphoteric polymer as the non-film forming polymer. In some examples, the print medium surface treatment comprises the second composition even if the first composition comprises a cationic polymer. Moreover, in some examples of the print medium surface treatment, the first composition comprises the second composition if the non-film forming polymer includes one or both of an anionic polymer and an amphoteric polymer. In some examples, the first composition may comprise the second composition (i.e., the multivalent metal ion) if the non-film forming polymer includes a cationic polymer.

The multivalent metal ion may be divalent or greater and be part of a metallic salt in the second composition of the print medium surface treatment. The metallic salt may include, but is not limited to, water-soluble multivalent metallic salts. In some examples, the metallic salt may include metal cations, such as Group II metals, Group III metals, and transition metals, and combinations of two or more thereof. Specific examples of the metals include, but are not limited to, calcium, copper II, nickel, magnesium, zinc, barium, iron, aluminum, chromium, for example.

The multivalent metal ion includes a counter ion, the nature of which depends on the nature of the multivalent metal ion, for example. The combination of multivalent metal ion and counter ion forms the metallic salt in the second composition, which in many examples is water soluble. Specific examples of counter ions for multivalent metal ions include, but are not limited to, halogen anion, such as chloride, bromide and iodide; carboxylic acid anion, such as, e.g., acetate; phosphoric acid anion; sulfuric acid anion (sulfates); sulfites; phosphates; chlorates; phosphonium halide salts, such as, e.g., hexafluorophosphorus anion; tetraphenyl boronic anion; perchlorates; nitrates; phenolates, or a combination of two or more thereof, for example. In some examples, the second composition comprises the multivalent metal salt, which may be, but is not limited to, one or more of aluminum nitrate, calcium chloride, magnesium nitrate, and salts of organic acids, for example.

An amount of the multivalent metal ion in the print medium surface treatment described herein is dependent, for example, on one or more of the nature of the multivalent ion, the nature of the anion, the nature and type of the non-film forming polymer, and the nature of the ink. For example, an amount by % weight of multivalent ion in the print medium surface treatment is within a range of about 0.5% to about 20%. In some examples, the amount of the multivalent metal ion in the print medium surface treatment is within the range of about 0.5% to about 15%, or about 0.5% to about 10%, or about 0.5% to about 5.0%, or about 1.0% to about 20%, or about 1.0% to about 15%, or about 1.0% to about 10%, or about 1.0% to about 5.0% by weight.

In some examples in accordance with the principles described herein, a print medium is provided that comprises ink receiving base material and the print medium surface treatment described above that is associated with the ink receiving base material on one or both major surfaces of the base material. The print medium in accordance with the principles described herein also may be interchangeably referred to as 'treated print medium' and both have the same meaning herein. The print medium is used in printing images using a printing technology, for example web press printing. An ink receiving base material is a material that is capable of receiving and retaining ink that is applied to the material such as, for example, by printing. For example, the ink receiving base material has one or both of good affinity and good compatibility for the ink that is applied to the ink receiving material.

Examples of ink-receiving base materials include, but are not limited to, natural cellulosic material; synthetic cellulosic material (such as, for example, cellulose diacetate, cellulose triacetate, cellulose propionate, cellulose butyrate, cellulose acetate butyrate and nitrocellulose); metal material; or material comprising one or more polymers including, but not limited to, polyolefins, polyesters, polyamides, ethylene copolymers, polycarbonates, polyurethanes, polyalkylene oxides, polyester amides, polyethylene terephthalate, polyethylene, polystyrene, polypropylene, polycarbonate, polyvinyl acetal, polyalkyloxazolines, polyphenyl oxazolines, polyethylene-imines, polyvinyl pyrrolidones, and combinations of two or more of the above, for example. In some examples, the ink receiving base material comprises a paper base including, but not limited to, paper stock, cardboard, paperboard, or paper laminated with plastics.

In some examples, the print medium comprises a base substrate material and a coating or layer of an ink receiving material applied to a surface of the base substrate. For example, the base substrate material may be paper-based and an ink receiving coating may be applied on one or both major sides of the paper base substrate, for example during paper manufacturing. The print medium may be planar, either smooth or rough, or such other shape that is suitable for the particular purpose for which it is employed. The print medium may be porous or non-porous, rigid, semi-rigid, or flexible, for example. Planar substrates may be in the form of a film, plate, board, roll or sheet, for example.

As mentioned above, the print medium surface treatment is associated with the print medium. The phrase 'associated with' means that the print medium surface treatment is coated on, adsorbed on, or absorbed in, for example, at least one surface of the ink receiving material base. The association between the ink receiving material base and the surface treatment is achieved by bringing the surface treatment and the ink receiving material base into contact by, for example, spraying, dipping, blade coating, padding, metered-rod, air-knife coating, knife coating, or film-transfer method. In some examples in accordance with the principles described herein, the first composition comprises the second composition, as mentioned above. In these examples, the first composition and the second composition of the surface treatment may be applied to the ink receiving base material of the print medium in combination to form a single layer or coating of the surface treatment on a surface of the ink receiving base material. When the first composition comprises an anionic polymer as the non-film forming polymer in these examples, the mixing order of the ingredients of the compositions is such that incompatibilities in the mixing process are prevented. For example, all ingredients, except the multivalent metal salt, are thoroughly mixed together (for example, for at least 10-15 minutes) before addition of the multivalent metal salt into the surface treatment solution or formulation.

In other examples in accordance with the principles described herein, the first composition and the second composition may be applied to the ink receiving base material of the print medium separately as a surface treatment system to form two adjacent layers or coatings of the surface treatment on the surface of the ink receiving base material. In some examples, the second composition is applied to the surface of the ink receiving base material to form a layer on the ink receiving base surface followed by application of the first composition in a layer or coating in association with one or both of the second composition layer and the ink receiving base material to form adjacent layers of the treatment system on the surface. For example, the first composition is directly associated with the second composition layer and indirectly associated with the ink receiving base surface. In other examples, the first composition may be applied to the surface of the ink receiving base material to form a first layer directly associated with the surface of the ink receiving base material. Then, the second composition may be applied on the first layer in association with one or both of the first composition and the ink receiving base material to form the adjacent layers of the treatment system on the surface.

In some examples where the ink receiving material is base paper stock, the print medium surface treatment may be applied on the base paper stock by an on-line surface size press process such as a puddle-sized press or a film-sized press, or the like. The puddle-sized press may be configured as having horizontal, vertical, or inclined rollers. The film-sized press may include a metering system, such as gate-roll metering, blade metering, Meyer rod metering, or slot metering, for example. In some examples, a film-sized press with short-dwell blade metering may be used as an application head to apply a coating solution.

In addition to on-line surface sizing processing, off-line coating technologies can also be used to apply the surface treatment to the ink receiving base material of the print medium. Examples of suitable coating techniques include, but are not limited to, slot die coaters, roller coaters, fountain curtain coaters, blade coaters, rod coaters, air knife coaters, gravure applications, and air brush applications, for example.

Amounts of the first composition and the second composition (when present) of the print medium surface treatment on the print medium are dependent on one or more of the nature of the ink receiving base material, the nature of the ink to be printed, the type of print medium, the respective composition in the first layer, the respective composition in the second layer, and whether the compositions are combined and applied together or separately, for example. The amount of the surface treatment solution or formulation is sometimes referred to as coating dry weight. For example, the total coating dry weight of the print medium surface treatment solution or formulation may be within a range of about 2 grams per square meter (gsm) to about 50 gsm. In some examples, the total coating dry weight of the print medium surface treatment may be within the range of about 2 gsm to about 40 gsm, or about 2 gsm to about 30 gsm, or about 2 gsm to about 20 gsm, or about 2 gsm to about 15 gsm, or about 5 gsm to about 50 gsm, or about 5 gsm to about 40 gsm, or about 7 gsm to about 30 gsm, or about 7 gsm to about 20 gsm, or about 7 gsm to about 15 gsm. In some examples, the amount in dry coating weight of the first composition as the first layer of the print medium surface treatment system is within a range of about 2 gsm to about 15 gsm, or about 2 gsm to about 10 gsm, or about 2 gsm to about 7 gsm. Moreover, in some examples, the amount in dry coating weight of the second composition as the second layer of the print medium surface treatment system is within a range of about 2 gsm to about 50 gsm, or about 4 gsm to about 40 gsm, or about 6 gsm to about 30 gsm, or about 8 gsm to about 20 gsm, or about 10 gsm to about 15 gsm, or about 5 gsm to about 50 gsm, or about 7 gsm to about 40 gsm, or about 9 gsm to about 30 gsm, or about 10 gsm to about 20 gsm, or about 7 gsm to about 15 gsm.

Following application of the print medium surface treatment formulation to the ink receiving base to form the print medium, the surface treatment formulation is dried using non-film forming conditions, such that the polymer in the surface treatment composition does not form a continuous polymeric film. In some examples, the surface treatment of the print medium is dried in a suitable device or using a suitable technique that sufficiently dries the surface treatment formulation coated on the print medium, for example, an atmosphere controlled chamber or device. In some examples, convective or forced hot air, a heater, light irradiation (e.g., IR lamps), heating drums, or a combination of such drying methods may be used. In some examples, the surface treatment of the print medium is dried in a non-film forming environment for a period of time, e.g., depending on the device and technique used for drying.

The treated print medium (i.e., the 'print medium') is then stored under appropriate (i.e., non-film forming) conditions until use. Moreover, the print medium may be converted into sheets for desk top or floor standing printers, or wound in rolls suitable for web press printing, or packaged for other types of printing. In the printing stage, the treated print medium presents a non-film forming surface, the print medium is absorptive to an ink printed thereon. In contrast, in the post-processing stage, the surface of the printed medium has a continuous film formed thereon (or is 'film-formed'), and the treated surface is or becomes non-absorptive in the post-processing stage. In particular, the polymer forms a continuous film at an outermost layer or surface to encapsulate or embed underlying material, e.g., an absorbed ink. Moreover, the polymer film provides a level of gloss to the printed medium along with other physical protection from damage to a printed image, such as from mechanical rub force, moisture attack, and solvent attack, for example from a highlighter.

As mentioned above, the print medium may be employed to print images on one or more surfaces of the print medium. In some examples of the principles described herein, a method of printing an image comprises depositing ink that comprises particulate colorants, which may be positively or negatively charged or both, to form an image on a surface of the print medium (i.e., 'the printed medium'). The method further comprises subjecting the printed medium to conditions for crashing the particulate colorants of the ink with the surface treatment composition (according to any of the examples described above) on the printed medium. The method then further comprises subjecting the printed medium to post-crashing conditions for forming a polymeric film on the surface of the printed medium. The polymeric film is formed by the polymer provided in the surface treatment composition that embeds or encapsulates the ink colorants of the image pattern, as also described above.

In some examples, the conditions for crashing the particulate colorant with the surface treatment composition include a temperature below room temperature, at room temperature and elevated temperature. In an example, the ink is applied to the print medium at room temperature, and in another example, the ink is applied onto pre-heated rolls, which has a temperature range of from about 40° C. and about 80° C., or about 50° C. and about 70° C., for example.

The printed image on the print medium may be dried during or after the particulate colorant of the ink is subjected to conditions for crashing. The printed image may be dried using hot air, a heater or light irradiation (e.g., IR lamps), or a combination of such drying methods, for example. Drying the printed image comprises using a temperature at atmospheric pressure that is at least 5° C. or more, or at least about 10° C., or at least about 15° C., or at least about 20° C., or more below the Tg of the polymer of the surface treatment composition.

In some examples, the post-crashing conditions for forming a polymeric film by the polymer in the surface treatment composition include, but are not limited to, well-controlled film-forming drying conditions, or calendering processes, or a combination thereof. In some examples, the well controlled film-forming drying conditions may include a gradual temperature increase from a first temperature, e.g., for drying the printed image, as described above, to a temperature at or above the Tg of the polymer over a period of time. This is explained more fully as follows: drying time and drying capacity are to ensure that the heat is sufficient enough to 'fuse' the polymer, i.e., to change from individual polymer particles to a continuous polymer film. An apparatus for film-forming drying includes, but is not limited to, infrared (IR) dryer, hot surface roll, hot air floatation dryer, or a combination of two or more of the above, for example.

In some examples, the post-crashing film-forming conditions are provided during a calendering process, which may be carried out using any suitable calendering apparatus including, but not limited to, a machine calender, a nip-calender, a soft calender, a supercalender, or a shoe calender, for example. The calendering apparatus may be an on-line or an off-line calender machine. The calendering conditions include a pressure and a temperature that promotes film-forming of the polymer. The calendering temperature may be provided by friction from the calendering drum itself, such that low heat load is used to heat the calendering drum or roll. For example, the calendering pressure may be in the range of about 68 bar (or 1000 psi) to about 204 bar (or 3000 psi), at a low heat load. In some examples, the calendering pressure is about 68 bar to about 180 bar, or about 68 bar to about 150 bar, or about 68 bar to about 120 bar, or about 68 bar to about 102 bar, or about 102 bar to about 120 bar, or 102 bar to about 180 bar, or about 102 bar to about 204 bar at a temperature within a range of about 45° C. to about 105° C., such that the polymer transforms from a particulate state to a relatively continuous film state, for example. In other examples, the temperature during calendering may be in a range of about 60° C. to about 75° C. at a pressure within a range of about 75 bar to about 90 bar, to convert the particulate polymer to a continuous film. The calendering process also imparts smoothness and gloss to the printed medium.

In some examples in accordance with the principles described herein, the print medium, the surface treatment therefor, and the method of printing are useful in a variety of printing applications and with a variety of printing technologies. For example, the print medium is useful in printing of photographic images and high gloss images. In some examples, the print medium is useful in web press printing such as commercial or high speed inkjet web press printing or offset printing of books, magazines and brochures, for example. In particular, the variety of post-crashing film forming conditions described above according to the method of printing herein facilitates using any suitable printer including, but not limited to, offset printers, inkjet printers, and web press printers, for example, to produce printed media. The examples in accordance to the principles herein are particularly suited for providing glossy printed media having one or more of high gloss, good to excellent wet and dry rub durabilities, high print density and color gamut volume, and minimum to no visual color-to-color bleed, without using high cost raw materials and photo-quality base stock.

EXAMPLES

Unless otherwise indicated, materials in the experiments below may be purchased from Aldrich Chemical Company, St. Louis Mo.

Preparation of the Print Medium Surface Treatment Formulation

A surface treatment formulation in accordance with the principles described herein, including the first composition that comprised the second composition in intimate combination, was prepared by combining the following raw materials: calcium chloride (8 parts) (Dow Chemicals, Midland, Mich.), clay (50 parts) (BASF Corp., Germany), calcium carbonate (50 parts) (Specialty Minerals Inc., Bethlehem, Pa.), MOWIOL® 1598 polyvinyl alcohol (6 parts) (Kurraray, Houston, Tex.), AC22® defoamer (0.35 parts) (Performance Process Inc., Mundelein, Ill.), and ammonium polystyrene (2 parts) (Sigma Aldrich, St. Louis, Mo.). The chemicals were mixed with water until reaching 46% by weight solids. The above formulation was mixed with a laboratory stirrer (Stir-Pak) for 15 min.

Preparation of Print Medium

The surface treatment prepared as described above was applied to a paper-based ink receiving material using a size press and blade coating techniques. Following application of the surface treatment formulation to the paper base to form the print medium, the print medium was air dried. The surface treatment had a dry weight of 7 gsm applied on each side of the ink receiving material.

Preparation of a Printed Medium

The print medium was employed to print images using an HP Office Jet 8000 printer (Hewlett-Packard, Calif.) using a default ink from HP (HP 940 series) and a normal printmode.

Preparation of a Comparison Sample Medium

For purposes of comparison and not in accordance with the principles described herein, Appleton Coated Book paper was coated with a comparison composition comprising the same raw materials and quantities prepared as above except for the polymer. In place of the high Tg ammonium polystyrene polymer, a low Tg ionized-gloss promoter polymer (ammonium polystyrene, from Aldrich, St Louis, Mo.) was mixed into the comparison composition. The comparison composition was applied to the Appleton Coated Book paper in a similar fashion as described above (i.e., 7 gsm dry weight per side applied to both sides). The comparison sample was employed to print the same images as was printed in the preparation of the printed medium above using the same printer as employed above.

Evaluation Testing

Both the printed medium and the printed comparison medium were subjected to tests for black ink optical density (KOD), 60° image gloss, bleed, waterfastness and dry-rub durability and 24 hour Highlighter smear. The results are summarized in Table 1.

TABLE 1

| PRINTED MEDIA | KOD | 60° Image Gloss | Bleed (microns) | Waterfastness and Dry-rub durability | Highlighter Smear 24 hour | |
|---|---|---|---|---|---|---|
| | | | | | 1 Pass | 2 Pass |
| Appleton Coated Book Comparison Sample | 1.62 | 22.9 | 358.14 | Good | Good | Poor |
| Print Medium | 1.90 | 64.6 | 228.6 | Excellent | Excellent | Excellent |

KOD testing was carried out as follows: KOD (black optical density) was measured with a Spectro-densitometer Model 938 supplied by X-rite. The setting used was: ANSI status A. The result is reported as an average from 3 measurements. The higher KOD, the better the result.

60° Image Gloss testing was carried out as follows: A BYK Glossmeter was used at 60° observation angle. A higher gloss measurement signified a glossier paper.

Bleed testing was carried out as follows: An edge acuity (bleed), expressed in micrometers, measures the appearance of geometric distortion of an edge from its ideal position (a ragged edge appears rough or wavy rather than smooth or straight). The measure of bleed is the standard deviation of the residuals from a line fitted to the edge threshold of the line (calculated perpendicular to the fitted line). Edge acuity is measured with black line of 1 mm in theoretical width at vertical position. The measurement was done on Personal Image Analysis System provided by Quality Engineering Associates (QEA). The result is reported as an average from 6 measurements. A lower number indicated a better result.

Waterfastness and Dry-Rub Durability testing was carried out as follows: Waterfastness was tested by dripping 250 microliters of distilled water on the printed area of the print medium and was rated visually using a rating system of poor, fair, good or excellent. Dry rub durability was tested by dripping 250 microliters of distilled water on the printed area and then rubbing it with a laboratory wipe (Kimwipe®, Kimberly-Clark Corp., WI) with a 1.8 kilogram weight and 5 cycles at 20 cycles/minute speed. A visual rating of poor, fair, good or excellent was used. The rating of 'poor' meant more than 50% loss of imaged area; 'fair' meant between about 25% to 49% loss of image area, 'good' meant between about 10% to 25% loss of image area, and 'excellent' meant less than 10% image loss of the image area.

Highlighter Smear-24 Hour testing was carried out as follows: A Faber-Castell® highlighter (Faber-Castell AG Corp., Nurenberger, Del.) was mounted on an automatic machine to highlight text in the printed images in line format (across in a line direction) to see how much ink was smeared from the printed image text. The colorants from the printed images were partially smeared and transferred to the unprinted area. One pass meant that the highlighter was run over the printed image once; two passes meant that the highlighter was run over the printed image twice. The results were rated based on a poor, good, excellent scale. 'Poor' meant the printed text became illegible (too much smearing); 'Good' meant printed text was legible, but smearing was visible; and 'Excellent' meant no visible smearing observed on the printed text.

Thus, there have been described examples of a printed medium surface treatment and a print medium that employ a non-film forming polymer and a method of printing using the print medium. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A print medium surface treatment, comprising:
   a first composition comprising:
   a filler; and
   a polymer that is non-film forming until subjected to a film forming condition, the film forming condition being heat, ultraviolet (UV) exposure, plasma treatment, or a combination thereof,
   wherein the first composition has a charge density that is large enough to promote crashing of particulate colorants of an ink and low enough to avoid crashing of the filler.

2. The print medium surface treatment of claim 1, wherein the polymer is a cationic polymer that provides the charge density.

3. The print medium surface treatment of claim 2, wherein the charge density of the cationic polymer is in the range of 0.0008 to 0.006, and wherein the charge density is a number of ionic monomer units over a total number of monomer units in a molecular chain of the cationic polymer.

4. The print medium surface treatment of claim 2, further comprising a second composition, the second composition comprising a multivalent metal ion.

5. The print medium surface treatment of claim 1, wherein the first composition further comprises a multivalent metal ion, wherein the metal of the multivalent metal ion is a Group II metal, a Group III metal, or a transition metal, or a combination thereof.

6. The print medium surface treatment of claim 1, wherein the polymer comprises one or both of an anionic polymer and a neutral amphoteric polymer, the first composition further comprising a multivalent metal ion that provides the charge density.

7. The print medium surface treatment of claim 6, wherein the anionic polymer is selected from the group consisting of poly(meth)acrylic acids, polystyrene sulfonic acids, poly(vinylphosphates), poly(methacryloyloxyethylsuccinates), poly(methacryloxyethylphosphates), poly(2-acrylamido-2-methyl-1-propanesulfonic acids), poly(2-acrylamidoglycolic acids), and combinations thereof.

8. The print medium surface treatment of claim 1, wherein the polymer has a glass transition temperature (Tg) in the range of 45° C. to 170° C.

9. The print medium surface treatment of claim 1, wherein the first composition further comprises one or both of a binding agent and a defoaming agent.

10. The print medium surface treatment of claim 1, wherein the polymer is a cationic polymer having cationic monomer units derived from ethylenically unsaturated monomers of the type of one or more of N,N-dialkyl(meth)acrylamides, dialkylaminoalkyl(meth)acrylamides, and N-alkyl(meth)acrylamides.

11. The print medium surface treatment of claim 1, wherein the filler is an inorganic pigment selected from the group consisting of clays, calcium carbonate, aluminum silicate, mica, magnesium carbonate, silica, alumina, boehmite, talc, and combinations thereof.

12. A print medium, comprising:
   an ink receiving base material; and
   a surface treatment associated with the ink receiving base material, the surface treatment comprising:
   a first composition that comprises a polymer that is non-film forming until subjected to a film forming condition, the film forming condition being heat, ultraviolet (UV) exposure, plasma treatment, or a combination thereof, a filler, and a binder, wherein the first composition has a charge density that is large enough to promote crashing of particulate colorants of an ink and low enough to avoid crashing of the filler, and wherein either the polymer comprises one or both of an anionic polymer and a neutral amphoteric polymer and the first composition further comprises a multivalent metal ion or the polymer comprises a cationic polymer.

13. The print medium of claim 12, wherein the polymer comprises one or both of the anionic polymer and the neutral amphoteric polymer, and wherein first composition further comprises a second composition comprising the multivalent metal ion, the first composition and the second composition being associated with the ink receiving base material as a single layer.

14. The print medium of claim 12, wherein the surface treatment further comprises a second composition comprising the multivalent metal ion, the first composition and the second composition being associated with the ink receiving base material as adjacent layers.

15. A method of printing an image, the method comprising:
- depositing ink on a surface of a print medium to form an image, the ink comprising particulate colorants, the print medium comprising a surface treatment associated with an ink receiving base material, wherein the surface treatment comprises:
  - a first composition that comprises a polymer that is non-film forming until subjected to a film forming condition, the film forming condition being heat, pressure, ultraviolet (UV) exposure, plasma treatment, or a combination thereof, a filler, and a binder, wherein the first composition has a charge density that is large enough to promote crashing of the particulate colorants of the ink and low enough to avoid crashing of the filler, and wherein either the polymer comprises one or both of an anionic polymer and a neutral amphoteric polymer and the first composition further comprises a multivalent metal ion or the polymer comprises a cationic polymer;
- subjecting the print medium to conditions to crash the particulate colorants into the surface treatment; and then
- subjecting the print medium to the film forming condition to form a continuous film from the polymer on the surface to embed the particulate colorants.

16. The print medium surface treatment of claim 1 wherein the film forming condition is heat at a temperature in the range of 45° C. to 105° C.

17. The print medium surface treatment of claim 8 wherein the film forming condition is heat at a temperature greater than the glass transition temperature of the polymer.

18. The method of claim 15 wherein the print medium surface treatment polymer is porous prior to subjecting the print medium to the film forming condition.

19. The print medium surface treatment of claim 1 wherein the film forming condition is ultraviolet (UV) exposure, plasma treatment, or a combination thereof.

* * * * *